US007769037B2

(12) United States Patent
Booth, III et al.

(10) Patent No.: US 7,769,037 B2
(45) Date of Patent: Aug. 3, 2010

(54) TECHNIQUES FOR USING FIRST SIGN OF LIFE AT EDGE NODES FOR A VIRTUAL PRIVATE NETWORK

(75) Inventors: Earl Hardin Booth, III, Raleigh, NC (US); William Mark Townsley, Nashville, TN (US); Wei Luo, San Jose, CA (US); George Wilkie, Dalgety Bay (GB)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 11/145,752

(22) Filed: Jun. 6, 2005

(65) Prior Publication Data
US 2006/0187856 A1    Aug. 24, 2006

Related U.S. Application Data

(63) Continuation-in-part of application No. 11/142,768, filed on Jun. 1, 2005.

(60) Provisional application No. 60/654,661, filed on Feb. 19, 2005.

(51) Int. Cl.
*H04L 12/28* (2006.01)
(52) U.S. Cl. .................................................. 370/419
(58) Field of Classification Search ................ 370/217, 370/229, 239, 252, 254, 390, 392, 395.53, 370/400, 401, 419
See application file for complete search history.

(56) References Cited

U.S. PATENT DOCUMENTS 5,959,972 A    9/1999 Hamami 6,028,862 A    2/2000 Russell et al.
6,125,119 A    9/2000 Cherukuri et al.

(Continued)

FOREIGN PATENT DOCUMENTS

CN    101218575 A    11/2005

(Continued)

OTHER PUBLICATIONS

J. Heinanen et al., Using RADIUS for PE-Based VPN Discovery, Draft-IETF-L2VPN-Radius-PE-discovery-00.TXT, Feb. 1, 2004, Publisher: IETF.ORG, Published in: Internet.

(Continued)

*Primary Examiner*—Chirag G Shah
*Assistant Examiner*—Yong Zhou
(74) *Attorney, Agent, or Firm*—Patent Capital Group

(57) ABSTRACT

A method and apparatus for processing a signal on an intermediate network node at an edge of a provider packet-switched network to support a link-layer virtual private network includes receiving a signal on a particular interface. The particular interface is for a direct communication link to a customer network node outside the provider network. It is determined whether the signal indicates that the particular interface is changing from an inactive state to an active state, whereby the signal is called first sign of life (FSOL). If it is determined that the signal is FSOL, then configuration data is determined for configuring the particular interface for the particular virtual private network. The signal is processed based on the configuration data. These techniques allow a dynamic response to new signals on a customer interface without human intervention by the provider.

23 Claims, 8 Drawing Sheets

U.S. PATENT DOCUMENTS

| | | | |
|---|---|---|---|
| 6,381,246 | B1 | 4/2002 | Constantinof et al. |
| 6,549,533 | B1 | 4/2003 | Campbell |
| 6,829,215 | B2 | 12/2004 | Tornar |
| 7,042,988 | B2 | 5/2006 | Juitt et al. |
| 7,082,101 | B2 | 7/2006 | Kim et al. |
| 7,124,189 | B2 | 10/2006 | Summers et al. |
| 7,197,550 | B2 | 3/2007 | Cheline et al. |
| 7,340,519 | B1* | 3/2008 | Golan et al. ............... 709/225 |
| 7,373,661 | B2 | 5/2008 | Smith et al. |
| 7,389,534 | B1 | 6/2008 | He |
| 7,420,933 | B2 | 9/2008 | Booth, III et al. |
| 7,421,736 | B2 | 9/2008 | Mukherjee et al. |
| 7,469,282 | B2 | 12/2008 | Taylor et al. |
| 7,483,996 | B2 | 1/2009 | Townsley et al. |
| 7,535,856 | B2 | 5/2009 | Booth, III et al. |
| 2001/0026553 | A1 | 10/2001 | Gallant et al. |
| 2003/0041170 | A1* | 2/2003 | Suzuki ....................... 709/238 |
| 2003/0110268 | A1 | 6/2003 | Kermarec et al. |
| 2003/0110276 | A1 | 6/2003 | Riddle |
| 2003/0217126 | A1 | 11/2003 | Polcha et al. |
| 2004/0006708 | A1 | 1/2004 | Mukherjee et al. |
| 2004/0044789 | A1 | 3/2004 | Angel et al. |
| 2004/0052263 | A1 | 3/2004 | Xu |
| 2004/0078621 | A1 | 4/2004 | Talaugon et al. |
| 2004/0156313 | A1* | 8/2004 | Hofmeister et al. ......... 370/229 |
| 2005/0097203 | A1 | 5/2005 | Unbehagen et al. |
| 2005/0114490 | A1 | 5/2005 | Redlich et al. |
| 2005/0135238 | A1 | 6/2005 | Taylor et al. |
| 2005/0135269 | A1 | 6/2005 | Saint-Hilaire et al. |
| 2005/0193103 | A1 | 9/2005 | Drabik |
| 2005/0213513 | A1* | 9/2005 | Ngo et al. .................. 370/254 |
| 2006/0018252 | A1 | 1/2006 | Sridhar et al. |
| 2006/0018300 | A1 | 1/2006 | Westberg et al. |
| 2006/0056384 | A1 | 3/2006 | Ishii et al. |
| 2006/0182037 | A1 | 8/2006 | Chen et al. |
| 2006/0187855 | A1 | 8/2006 | Booth, III et al. |
| 2006/0187937 | A1 | 8/2006 | Townsley et al. |
| 2009/0154466 | A1 | 6/2009 | Townsley et al. |

FOREIGN PATENT DOCUMENTS

| | | | |
|---|---|---|---|
| CN | 101099352 | A | 2/2006 |
| EP | 0917318 | A2 | 5/1999 |
| EP | 1844402 | A2 | 10/2007 |
| EP | 1856861 | A1 | 11/2007 |
| WO | WO 99-52244 | A1 | 10/1999 |
| WO | WO 2006-057849 | A2 | 6/2006 |
| WO | WO 2006-089214 | A1 | 8/2006 |

OTHER PUBLICATIONS

EP, Official Action, Supplementary European Search Report and Annex to European Search Report dated Jul. 27, 2009 (9 pages).

Chinese, The First Office Action, Filing No. 2005800310543, dated Jul. 10, 2009; 13 pages.

Chinese, The First Office Action, Filing No. 2006800017167, dated Oct. 9, 2009; 12 pages.

PCT, "International Preliminary Report on Patentability and Written Opinion of the International Searching Authority," for Application No. PCT/US2005/041225, dated Oct. 16, 2007, 8 pages.

PCT, "International Preliminary Report on Patentability and Written Opinion of the International Searching Authority," for PCT Application No. PCT/US2006/05817, dated Aug. 21, 2007, 4 pages.

PCT, "Notification of Transmittal of the International Search Report and the Written Opinion of the International Searching Authority, or the Declaration," for PCT Application No. PCT/US2006/05817, dated Jun. 26, 2006, 8 pages.

J. Heinanen et al., "Using RADIUS for PE-Based VPN Discovery," draft-ietf-L2VPN-radius-pe-discovery-02.txt; Publisher: IETF.org (Internet), Oct. 2005; 17 pages.

E. Rosen et al., "Provisioning, Autodiscovery, and Signaling in L2VPNs," draft-ietf-L2VPN-signaling-08.txt; Publisher: IETF.org (Internet), May 2006; 37 pages.

L. Martini et al., "Encapsulation Methods for Transport of Ethernet Over MPLS Networks"; www.rfc-editor.org/rfc/rfc4448.txt; Apr. 2006; 23 pages.

G. Gross, et al., PPP Over AAL5, Jul. 1, 1998, Publisher: ietf.org, Published in: Internet, 13 pages.

L. Mamakos et al., A Method for Transmitting PPP Over Ethernet (PPPoE), Feb. 1, 1999, Publisher: ietf. org, Published in: Internet, 17 pages.

European Search Report for Application No. PCT/US52005/041225, dated Aug. 5, 2009, 9 pages.

Indian Patent Application Serial No. 1983/DELNP/2007 filed Nov. 15, 2005, entitled "Techniques for Migrating a Point to Point Protocol to a Protocol for an Access Network," Applicant: Cisco Technology, Inc.; 53 pages.

Indian Patent Application Serial No. 4777/DELNP/2007 filed Feb. 17, 2006, entitled "Techniques for for Oversubscribing Nodes for Virtual Private Networks," Applicant: Cisco Technology, Inc.; 80 pages.

* cited by examiner

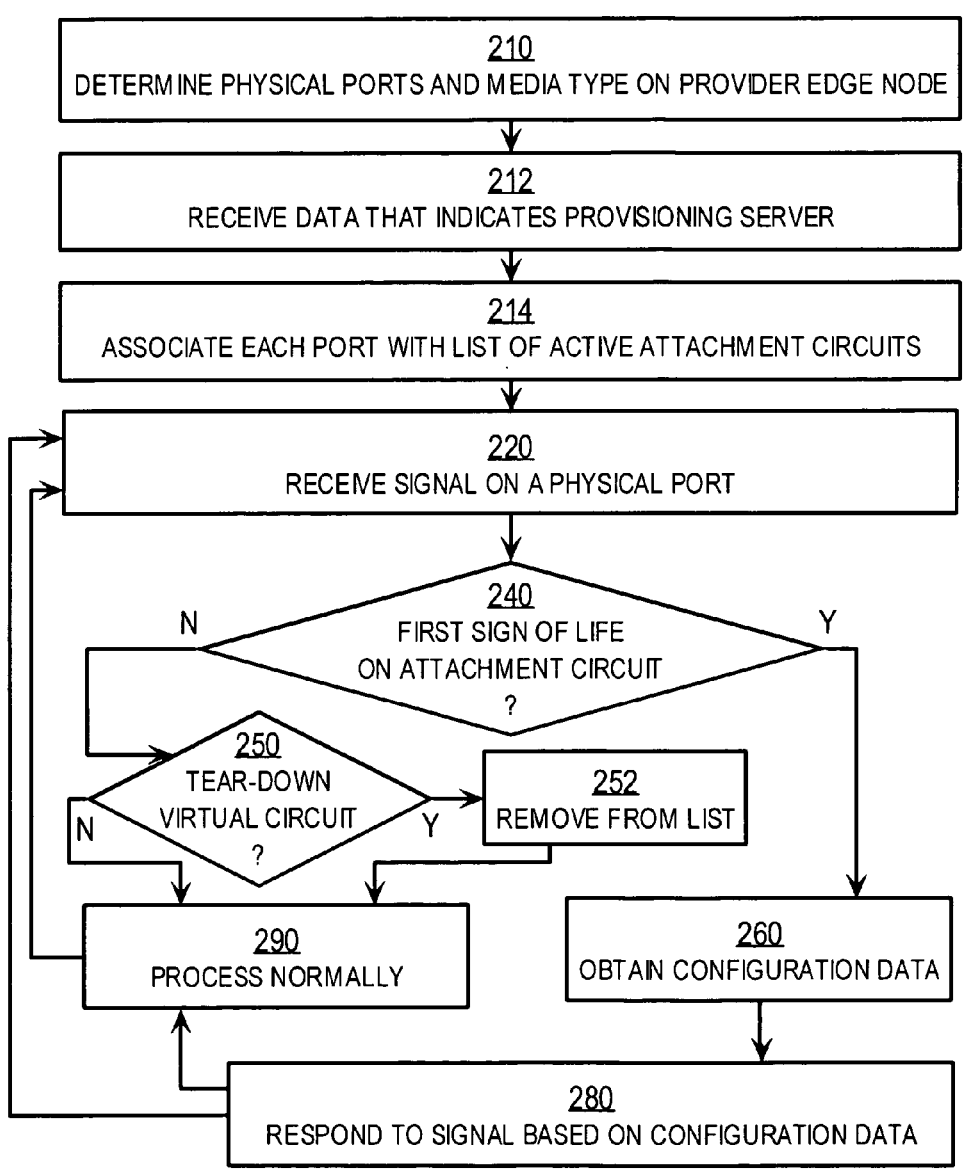

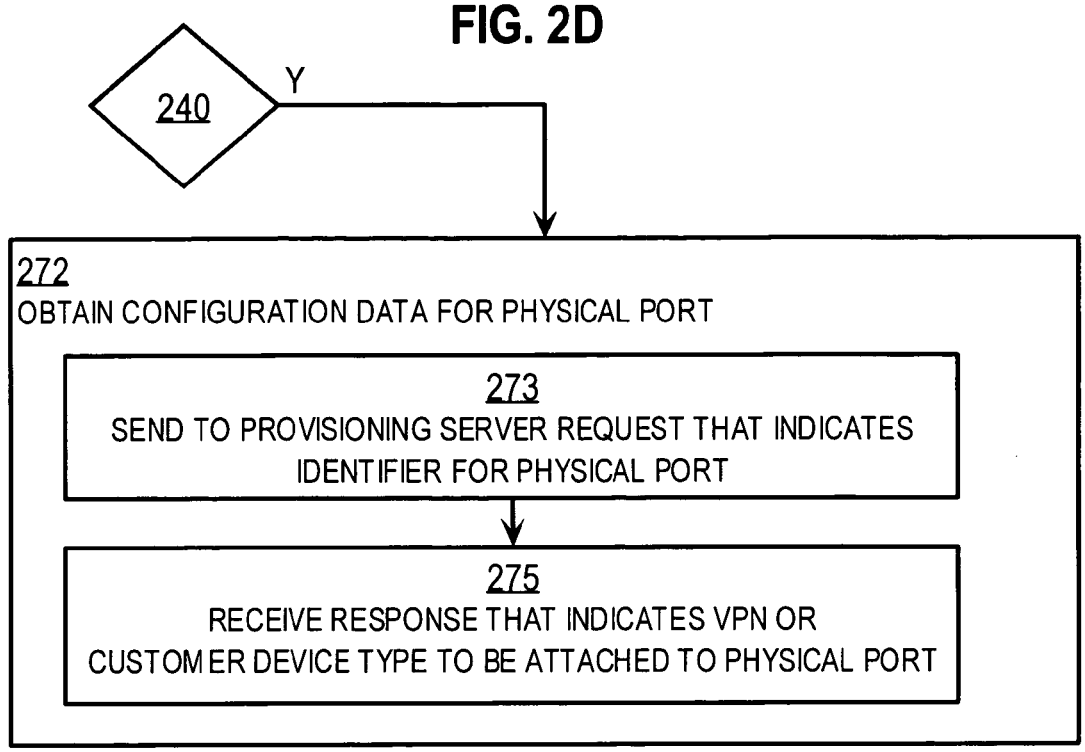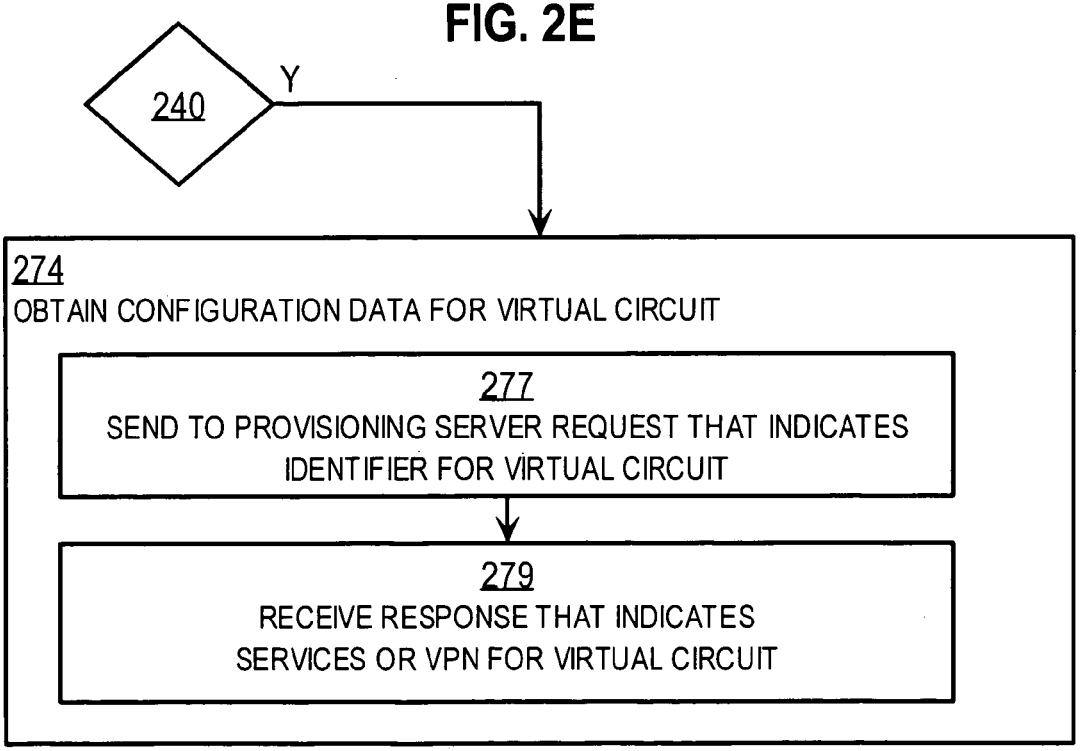

FIG. 3A

300 CUSTOMER EQUIPMENT (CE) ATTACHMENT CIRCUIT (AC) RECORD

| 302 ROUTER ID | 304 AC ID | 306 VC ID | 308 AC SERVICE |

FIG. 3B

320 VPN RECORD FOR PARTICULAR PROVIDER EDGE NODE (PE)

| 302 ROUTER ID | 306 VC ID | 324 OTHER PE LIST |

FIG. 3C

340 PSEUDO WIRE (PW) RECORD

| 302 ROUTER ID | 344 OTHER PE ID | 348 PW PROPERTIES |

US 7,769,037 B2

TECHNIQUES FOR USING FIRST SIGN OF LIFE AT EDGE NODES FOR A VIRTUAL PRIVATE NETWORK

CROSS-REFERENCE TO RELATED APPLICATIONS

This application claims benefit of Provisional Appln. 60/654,661, filed Feb. 19, 2005, the entire contents of which are hereby incorporated by reference as if fully set forth herein, under 35 U.S.C. §119(e).

This application claims benefit as a Continuation-in-part of application Ser. No. 11/142,768, filed Jun. 1, 2005, the entire contents of which are hereby incorporated by reference as if fully set forth herein, under 35 U.S.C. §120.

BACKGROUND OF THE INVENTION

1. Field of the Invention

The present invention relates to using one or more virtual private networks (VPNs) based on layer 2 protocols on a packet switching infrastructure that belongs to a trusted service provider; and in particular to configuring each customer interface to a provider edge network node for VPN operation without human intervention.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links.

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The layer 2 tunneling protocol (L2TP) is a link layer (layer 2) protocol established to provide a persistent virtual circuit as a tunnel between two end nodes of a trusted sub-network. In network parlance, a tunnel for data is simply a protocol that encapsulates that data. The persistent tunnel, or virtual circuit on a packet switched network is often called a pseudo-wire. L2TP facilitates the tunneling of point to point protocol (PPP) packets across an intervening network in a way that is as transparent as possible to both end-users and applications. Using L2TP tunneling, an Internet Service Provider (ISP), or other access service, can create a pseudo wire to link customer's remote sites or remote users with corporate home networks. More recent versions of L2TP facilitates tunneling of a number of data link types, including, but not limited to, Point to Point Protocol (PPP), Frame Relay (FR), Asynchronous Transfer Mode (ATM), High Level Data Link Control (HDLC) and Ethernet. L2TP is described at the time of this writing in Internet Engineering Task Force (IETF) request for comments (RFC) 2661 which can be found in a file named rfc2661.txt, which can be found, along with other RFC files, at the world wide web domain www.ietf.org in the file directory named rfc. The entire contents of RFC 2661 are hereby incorporated by reference as if fully set forth herein. L2TPv3 is described in RFC 3817 available in file rfc3817.txt in the same directory. The entire contents of RFC 3817 are hereby incorporated by reference as if fully set forth herein.

Some protocols follow a layer 2 protocol and precede a layer 3 protocol; and are said to be layer 2.5 protocols. For example, the multi-protocol layer switch (MPLS) is a layer 2.5 protocol that provides for the designation, routing, forwarding and switching of traffic flows through a network and supports the transfer of multiple data link (layer 2) types. MPLS is described at the time of this writing in IETF RFC 3031 and RFC 3032 which can be found in files named rfc3031.txt and rfc3031.tx, the entire contents of which are hereby incorporated by reference as if fully set forth herein.

A virtual private network (VPN) is a technology to logically separate the data packets traveling over the same physical network, so that a user of one VPN does not see the data communicated between users of a different VPN. ISPs frequently offer to customers VPNs that are implemented as one or more pseudo wires on a packet switched network (PSN) infrastructure, such as a network of routers using the Internet Protocol (IP) as a layer 3 protocol or using MPLS as a layer 2.5 protocol. A common approach for providing the tunneling functions for a VPN is to use the layer 2 tunneling of L2TPv3 as a payload in IP data packets. In some approaches a protocol for Any Transport over MPLS (AToM) available from CISCO SYSTEMS™, Inc. of San Jose Calif. is used to support layer 2 tunneling in a payload in MPLS data packets. Then layer 2 protocols, such as PPP, FR, ATM, HDLC, Ethernet are used in these tunnels to transmit customer data or control plane information over the VPN.

A customer contracts with an ISP to provide a VPN among customer sites and to support certain kinds and amounts of data traffic over that VPN. In response, the ISP configures interfaces to customer equipment on several intermediate network nodes at the edge of an ISP network (so-called "provider edge nodes," PE, or simply "edge nodes"). Each interface is configured to communicate the type of traffic designated for that interface and encapsulate it in one or more tunnels, each tunnel directed to one of one or more other interfaces on other edge nodes of the ISP network. In the parlance of this technology, configuring each affected interface on each affected edge node provisions the VPN.

A PE interface to customer equipment (CE) is called an attachment circuit (AC) or port. Each physical interface can support one or more logical attachment circuits. For example, a single physical interface for ATM traffic can support multiple ATM virtual circuits, which may be directed to different VPNs; each ATM virtual circuit is considered a different AC to be configured. Configuration data specifies values for one or more parameters for each attachment circuit (AC). The parameters and values depend on the layer 2 protocol to be supported in the VPN, the topology of the VPN, and the tunneling protocol used to establish the pseudo wires. Example configuration data for a logical ATM AC specifies a percentage of total bandwidth devoted to the logical AC, a cell-packing value, the other PE devices in the topology, and a control plane protocol to establish and maintain pseudo wires among the connected PE.

Currently, provisioning the VPN is a manual process, in which a network administrator determines which data packets on each interface are sent out on which link to the provider network using which designations to be recognized by a subsequent intermediate nodes and edge node as a separate tunnel. The manual provisioning process is tedious and error prone. Furthermore, when a new piece of customer equipment is connected to an edge node, that equipment is unable to communicate over the VPN unless and until the human administrator provisions the VPN to add the new interface. Thus the process is subject to delays. The delays grow in severity as the human administrator becomes busier. The tedium and propensity for error increase with the complexity of the VPN topology (e.g., as the numbers of interfaces and edge nodes increase).

Based on the foregoing description, there is a clear need for techniques to provision a VPN on a provider's network without the deficiencies of prior art approaches. In particular, there is a clear need for techniques to provision a VPN on a provider's network without human intervention whenever a new attachment circuit or provider edge node is added to or removed from the VPN.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram that illustrates at a high level a method for using a first sign of life (FSOL) on a customer attachment circuit at an edge node of a provider network, according to an embodiment;

FIG. 2D is a flow diagram that illustrates steps of the method of FIG. 2A for obtaining configuration data for a physical port in more detail, according to an embodiment;

FIG. 2E is a flow diagram that illustrates steps of the method of FIG. 2A for obtaining configuration data for a virtual circuit in more detail, according to another embodiment;

FIG. 3A is a block diagram that illustrates a customer interface record of configuration data, according to an embodiment;

FIG. 3B is a block diagram that illustrates a VPN record of configuration data, according to an embodiment;

FIG. 3C is a block diagram that illustrates a pseudo wire record of configuration data, according to an embodiment.

DETAILED DESCRIPTION

A method and apparatus are described for using a first sign of life (FSOL) on an attachment circuit, including using a FSOL for zero touch provisioning of edge nodes for virtual private networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Certain embodiments of the invention are described in the context of a single server on a host of a provider network away from the provider edge, which provisions a single, layer-two virtual private network (VPN) on an Internet Protocol (IP) infrastructure for a single customer; but the invention is not limited to this context. In other embodiments, fewer or more servers on hosts at or away from the provider edge provision one or more layer-two VPNs for one or more customers using one or more protocols on a packet switching network based on one or more protocols above layer 2, such as IP and multi-protocol layer switch (MPLS) protocol. In some embodiments, the provider edge nodes are already configured to provision the VPN and do not perform further provisioning; but, instead, respond to a FSOL on an attachment circuit based on that configuration data.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

1.0 Example Virtual Private Network

Figure 1A:
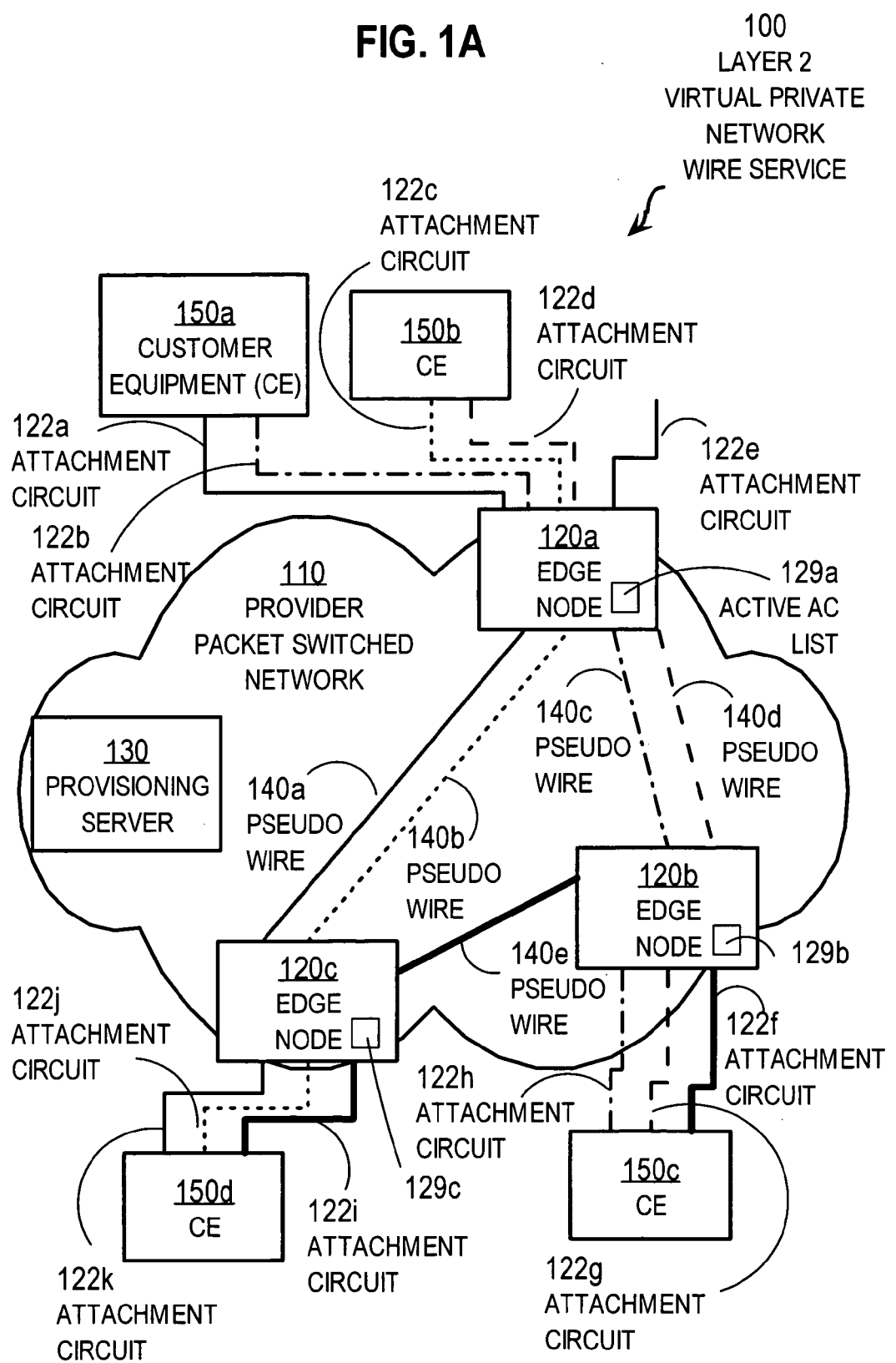
FIG. 1A is a block diagram that illustrates a virtual private network on a provider packet-switched network for a virtual private wire service, according to an embodiment.

FIG. 1A is a block diagram that illustrates a virtual private network 100 based on a virtual private wire service (VPWS) on a provider packet-switched network (PSN) 110, according to an embodiment. The provider PSN 110 includes two or more edge nodes, e.g., PE 120a, 120b, 120c (collectively referenced hereinafter as PE 120). Each PE 120 includes one or more physical interfaces to which customer premises equipment (CE) may be connected. The physical interfaces support one or more physical or logical attachment circuits (ACs) used by the customer to communicate over network 110. For example, PE 120a includes ACs 122a, 122b, 122c, 122d, 122e. CE 150a is connected to PE 120a through ACs 122a, 122b; and CE 150b is connected to PE 120a through ACs 122c, 122d. AC 122e is available for connecting to CE, but no CE is currently connected. Similarly, CE 150c is connected to PE 120b through ACs 122f, 122g, 122h. CE 150d is connected to PE 120c through ACs 122i, 122j, 122k. The CEs 150a, 150b, 150c, 150d are collectively referenced hereinafter as CEs 150. The ACs 122a, 122b, 122c, 122d, 122e, 122f, 122g, 122h, 122i, 122j, 122k are collectively referenced hereinafter as ACs 122. Also shown is provisioning server 130 on PSN 110.

VPN 100 includes multiple persistent tunnels between pairs of PEs. Each such tunnel is called a virtual circuit or pseudo wire (PW). FIG. 1A depicts five PWs, 140a, 140b, 140c, 140d, 140e (collectively referenced hereinafter as PWs 140) used to provide VPWS for point to point traffic among CEs 150. Point-to-point data packet traffic between CE 150a and CE 150d is carried by AC 122a and PW 140a and AC 122k. Point-to-point data packet traffic between CE 150b and CE 150d is carried by AC 122c and PW 140b and AC 122j. Similarly, point-to-point data packet traffic between CE 150a and CE 150c is carried by AC 122b and PW 140c and AC 122h; and such data packet traffic between CE 150b and CE 150c is carried by AC 122d and PW 140d and AC 122g. Point-to-point data packet traffic between CE 150c and CE 150d is carried by AC 122f and PW 140e and AC 122i. In some embodiments, one or more ACs 122 are logical ACs that share the same physical wire; e.g., ACs 122a, 122b are logical ACs that share the same physical transmission medium from edge node 120a to CE 150a. For example, FR, ATM and Ethernet virtual local area networks (VLANs) are attachment circuits which allow multiple customers (or services) to be transported on the same physical wire.

This complete collection of PWs in FIG. 1A is called a full mesh. In some circumstances, such a fill mesh involves more PWs and associated costs than are needed. For example, if customer needs are satisfied so long as CE 150d has a PW to CE 150b and CE 150c has a PW to CE 150a, then only two PWs are needed, e.g., 140a and 140c, with fewer associated attachment circuits including only 122j, 122c and 122h, 122b.

Figure 1B:
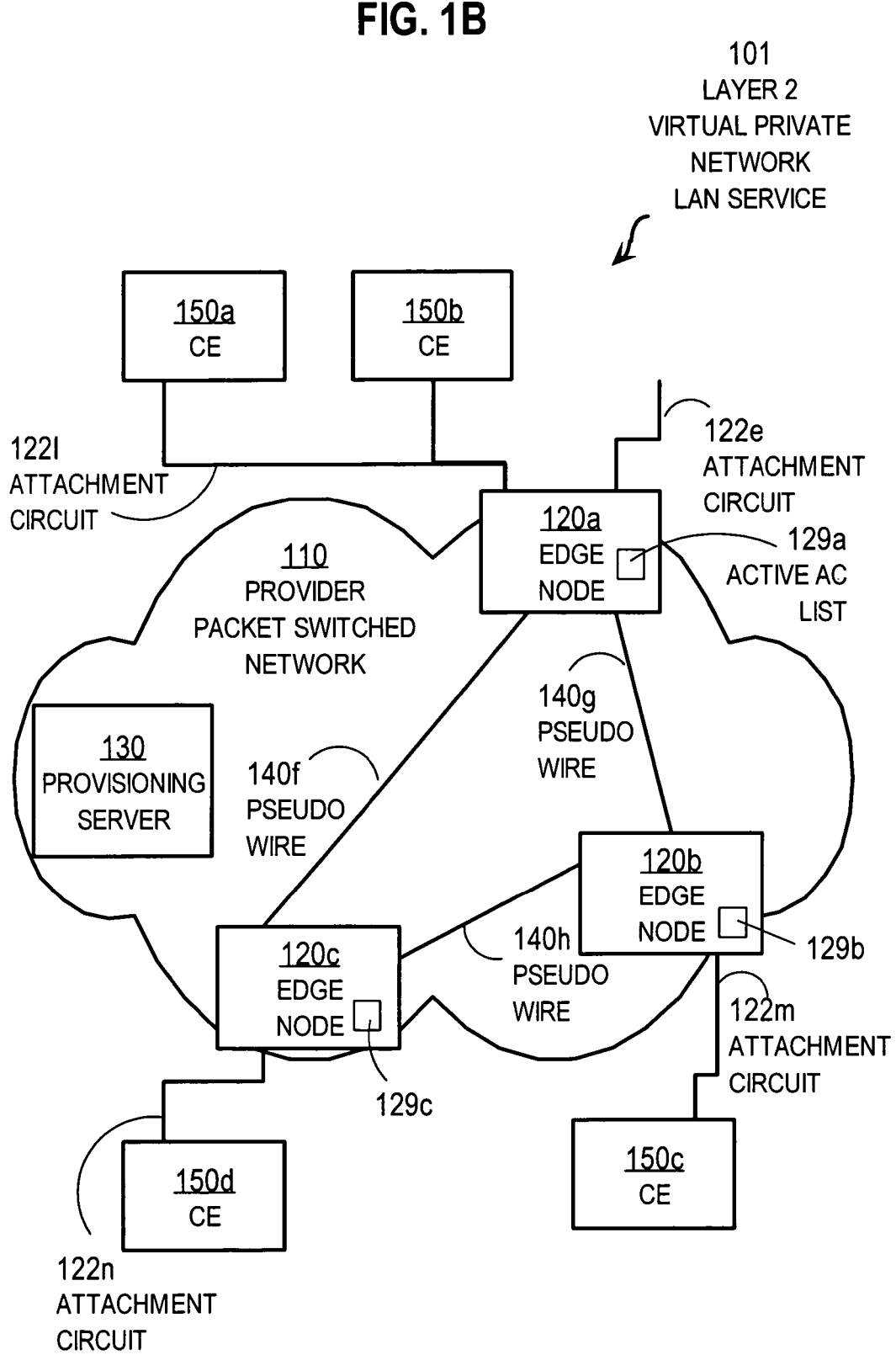
FIG. 1B is a block diagram that illustrates a virtual private network on a provider packet-switched network for a virtual private LAN service, according to an embodiment.

In some VPN service, called a virtual private local-area network (LAN) service (VPLS) every CE is connected to every other CE on the VPN and data traffic flows to them all as if on an Ethernet LAN. FIG. 1B is a block diagram that illustrates a virtual private network 101 on a provider packet-switched network 110 for VPLS, according to an embodiment. For example, VPN 101 includes sufficient PWs 140f, 140g, 140h to connect each PE 120a, 120b, 120c to the others. Traffic between different CEs on the VLAN is not distinguished by separate ACs and separate PWs. Thus, CEs 150a, 150b are on the same LAN, which forms AC 122l and traffic from both is carried to CE 150c via a single PW 140g to PE 120b and thence via a single AC 122m. Similarly traffic from both is carried to CE 150d via a single PW 140f to PE 120c and thence via a single AC 122n. Inactive AC 122e is kept separate for use in a different VPLS or VPWS VPN. Clearly, the provisioning of PSN 110 is different for the different VPNs 100 and 101, even though both involve the same PEs and CEs.

According to some embodiments of the invention, described in more detail below, each PE 120 includes a list of active ACs. As shown in FIG. 1A and FIG. 1B, PE 120a includes active AC list 129a, PE 120ba includes active AC list 129b, and PE 120c includes active AC list 129c. Hereinafter, active AC lists 129a, 129b, 129c are collectively referenced as active AC list 129.

2.0 Method at Provider Edge Node for Using FSOL

According to various embodiments of the invention, one or more provider edge nodes on the provider network detect and respond to first sign of life (FSOL) on an attachment circuit without further human intervention. For example, according to some embodiments, provisioning server 130 stores configuration data for unused AC 122e. When a new CE (not shown) or service is connected to AC 122e, the provider edge node (e.g., 120a) detects a FSOL and sends a request to provisioning server 130 to obtain configuration data. Provisioning server 130 sends the configuration data to PE 120a and causes new PWs (not shown) to be formed with PE 120b or PE 120c or both. Similarly, provisioning server 130 sends configuration data to PEs 120b, 120c that cause those PEs to switch the new PWs with new ACs (not shown) on PEs 120b, 120c, when those new ACs show FSOL. Thus provisioning server 130 provisions VPN 100 without human intervention based on FSOL on attachment circuits. If AC 122e joins VPN 101, instead of joining VPN 100, then provisioning server 130 causes PE 120a to merge AC 122e with LAN AC 122l and sends traffic from AC 122e over both extant PWs 140f, 140g.

In some embodiments, the edge node has already received configuration data, either from a server or manually, but the configuration data is not utilized for the attachment circuit until a FSOL is detected. In some embodiments, the attachment circuit is already configured for a certain type of service, but the FSOL indicates an attempt to use a different service. The edge node responds based on the difference between the configured service and the service indicated by the FSOL.

Figure 2B:
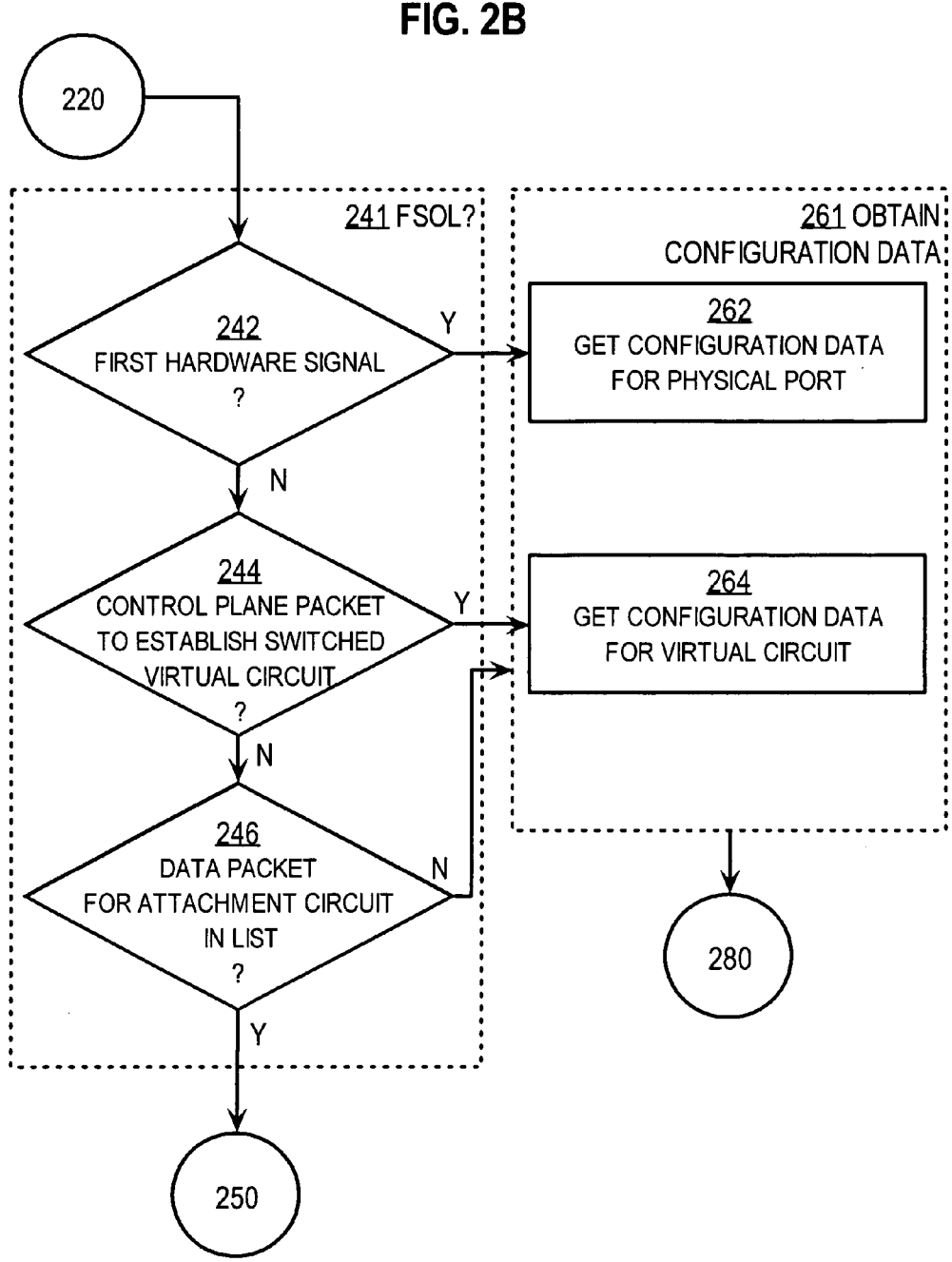
FIG. 2B is a flow diagram that illustrates steps of the method of FIG. 2A for detecting a first sign of life in more detail, according to an embodiment.

FIG. 2A is a flow diagram that illustrates at a high level a method 200 for using a first sign of life (FSOL) on a customer attachment circuit at an edge node of a provider network, according to an embodiment. Although steps are shown in FIG. 2A and subsequent flow diagrams (e.g., FIG. 2B, FIG. 2C, FIG. 2D, FIG. 2E) in a particular order for purposes of illustration, in other embodiments one or more steps may be performed in a different order or overlapping in time or omitted, or changed in some combination of ways.

In step 210, the provider edge node (e.g., PE 120a) determines physical ports and media types that are directed to customer equipment. Any method may be used to determine this list.

It is assumed for purposes of illustration that PE 120a has 24 physical ports for linking to customer equipment, 16 physical ports are Fast Ethernet (e.g., 4 ports of 100Base-T2 and 12 ports of 100Base-T4), 4 physical ports are ATM ports, and 4 physical ports are Frame Relay ports. It is further assumed that PE 120a has two other physical ports connected to other nodes in the provider network 110 (e.g., 2 physical ports that are Gigabyte Ethernet). In step 210, for example when PE 120a powers up, PE 120a builds a data structure that indicates identifiers for itself, its connections to other nodes in the provider network, and its interfaces to customer equipment. Example information for such a data structure is listed in Table 1.

TABLE 1

Example physical ports and media types for PE 120a.

| Physical port IDs | media type | Facing |
|---|---|---|
| 0 | null | self |
| 1 to 2 | Gigabyte Ethernet | provider network |
| 3 to 6 | Fast Ethernet (100Base-T2) | customer |
| 7 to 18 | Fast Ethernet (100Base-T4) | customer |
| 19 to 22 | ATM | customer |
| 23–26 | Frame Relay | customer |

Any method may be used to receive this data. In some embodiments, the information is input manually by a network administrator and stored locally or on a remote node. In some embodiments, some of the information is stored locally on the device by the original equipment manufacturer (OEM). In some embodiments, the data is retrieved from storage locally (e.g., from a read only memory, ROM) or remotely. In some embodiments, the data is sent in a message from another node on the network either in response to a message from the node requesting the data or in an unsolicited message. In some embodiments a combination of different methods is used.

In step 212, data is received that indicates a provisioning server (e.g., provisioning server 130) that provides data for provisioning a VPN. Step 212 is included in embodiments in which the provider edge node pulls VPN provisioning data from a provisioning server. Any method may be used to receive this information, as described above for step 210. In some embodiments, the configuration for provisioning a VPN is pushed to one or more provider edge nodes; and step 212 is omitted.

In step 214, each customer-facing physical port is associated with a list of active attachment circuits, such as active AC list 129. A list structure is preferred, because some physical ports may be used for multiple virtual circuits. Initially, for example when PE 120a powers up, the list 129a is likely to be empty with no active attachment circuits. Any method may be used to associate each customer-facing port with a list of active attachment ports. For example, a data structure is formed on PE 120a as list 129a. List 129a has a physical port ID and a link list with no entries, as shown in Table 2, below, for some customer-facing ports. In some embodiments, a single list of active attachment circuits is maintained for a provider edge node, and the physical port associated with each entry is indicated by the name for the attachment circuit. There may be local configuration data for this, essentially containing an identifier (ID) for each physical or logical interface configured, based on configuration data received. In some embodiments, there is automatic generation of an ID based on some algorithm, basically allowing any packet to arrive, deducing the logical port from the arriving packet, and generating an ID automatically. The provisioning server (or the person who provides data for the provisioning server), uses the same algorithm for determining the attachment circuit ID. In various embodiments, the ID is based on the platform, line-cards, or other hardware information, or requested and returned in messages formatted according to the simple network management protocol SNMP.

TABLE 2

Example initial associations between ports and active attachment circuits.

| Physical port ID | List of active attachment circuits |
|---|---|
| 3 | null |
| 4 | null |
| 5 | null |
| ... | null |

In step 220, a signal is received on a physical port facing customer equipment. For purposes of illustration it is assumed that a signal is received on physical port #4 that comprises multiple positive and negative voltage changes.

In step 240, it is determined whether the signal is a first sign of life (FSOL) for an attachment circuit for that port. More detail on step 240 is described in a later section with reference to FIG. 2B. In general, any Operations and Management (OAM) signaling used for setup, maintenance, troubleshooting, or teardown of a circuit may be used to detect a first sign of life (FSOL).

If the signal is not FSOL for an attachment circuit, control passes to step 250. In step 250, it is determined whether the signal is a control plane signal to tear down a virtual circuit. If so, control passes to step 252 in which the virtual circuit is removed from the list of active attachment circuits. Steps 250 and 252 are described in more detail in a later section. In some embodiments, steps 250 and 252 are omitted.

Control then passes to step 290 to process the signal normally. For example, after one or more attachment circuits have been active on the edge node, a data packet associated with one of those attachment circuits is processed in step 290. In step 290, a signal is processed according to any manner known in the art at the time the method 200 is implemented. For example, a data packet of multiple bits is examined and found to be in error or forwarded according to a routing table. Control then passes back to step 220 to receive another signal on a physical port.

If it is determined in step 240 that the received signal is FSOL, control passes to step 260 to obtain configuration data for an attachment circuit associated with the signal. For example, as described in more detail in a later section with reference to FIG. 2B, a signal received on a customer-facing physical port with a null list of active attachment circuits is determined to be FSOL; and control passes to step 260. In some embodiments, the signal includes data used to identify an attachment circuit. In some embodiments, the physical port ID is used to identify an attachment circuit. In some embodiments the configuration data includes data that indicates a VPN associated with the attachment circuit.

Any method may be used to obtain the configuration data, as described above for receiving data indicating the physical ports and the provisioning server, in steps 210 and 212, respectively. More detail on step 260 is described in a later section with reference to FIG. 2B, FIG. 2D and FIG. 2E.

In step 280, the provider edge node responds to the FSOL signal based on the configuration data. In some embodiments, step 280 includes configuring the attachment circuit on the provider edge node, for example to be switched to a particular VPN. In some embodiments, step 280 includes sending a message to a customer if the signal received on the physical port is not consistent with any service subscribed to by the customer, as defined by the configuration data. In some embodiments in which the attachment circuit is already configured, step 280 determines that no special action is called for and simply passes the signal on to step 290 for normal processing. In an illustrated embodiment, when consistent configuration data is found for the signal, an identifier for the attachment circuit is added to the list of attachment circuits associated with the physical port. Step 280 is described in a later section in more detail with reference to FIG. 2C.

Using method 200, a provider edge node (e.g., 120a) can respond dynamically, without human intervention, to signals received from customer equipment on any physical port (e.g., 122e) to automatically configure one or more attachment circuits, such as to join one or more VPNs.

Furthermore, using method 200, a provider edge node (e.g., 120a) can respond dynamically, without human intervention, to signals that are not consistent with the attachment circuits configured for a physical port. Normally, signals that are not consistent with configured attachment circuits are simply ignored, with no message to the sender or corrective action. Using method 200, either warnings can be sent to the sender, or corrective action can be taken in step 280, or both, as described in more detail below. It is noted that the actions taken in steps 260 and 280 are only performed on the FSOL for an attachment circuit, and not on subsequent data packets for the same attachment circuit. Therefore the processing load incurred by steps 260 and 280 is minor, and diminishes in percentage as attachment circuits continue to function after their FSOL.

2.1 Method for Obtaining Configuration Data

As described above, configuration data is obtained in step 260. Any method may be used to obtain the configuration data. In some embodiments, configuration data for attachment circuits already reside on the provider edge node (e.g., 120a). In the illustrated embodiments, the configuration data is obtained by sending a request for configuration data to a provisioning server (e.g., provisioning server 130) on the provider network.

Often, the configuration data is derived based on customer specifications for the topology for the VPN and level of surface—information that is received when the customer subscribes to the service. For example, configuration data is received and stored at provisioning server 130 that indicates for VPN 100 the service is VPWS; the attachment circuits 122 are frame relay virtual circuits, each identified by a data link connection identifier (DLCI); the participating edge nodes are PEs 120a, 120b, 120c; and PWs 140a, 140b, 140c, 140d, 140e have a certain level of service, e.g., a certain value for a per-hop behavior (PHB) parameter. The use of PHB to indicate level of service is described in RFC 3140 entitled "Per Hop Behavior Identification Codes," by D. Black, S. Brim, B. Carpenter, F. Le Faucheur (June 2001), the entire contents of which are hereby incorporated by reference as if fully set forth herein.

In an alternative example, configuration data is received and stored at provisioning server 130 that indicates for VPN 100 the service is VPWS; the attachment circuits 122b, 122c, 122h, 122j are ATM virtual circuits; the participating edge nodes 120 are PEs 120a, 120b, 120c; with connecting pseudo wires PW 140b and PW 140c that are built on MPLS and have a level of service indicated by a value of an MPLS experimental (EXP) parameter. The use of EXP to indicate level of service is described in RFC 3032 entitled "MPLS Label Stack Encoding" by E. Rosen, D. Tappan, G. Fedorkow, Y. Rekhter, D. Farinacci, T. Li, A. Conta, (January 2001), the entire contents of which are hereby incorporated by reference as if fully set forth herein. RFC 3032 and RFC 3140 are implementations of Differentiated Services Code Point (DSCP) described in RFC 2474 entitled "Definition of the Differentiated Services Field (DS Field) in the IPv4 and IPv6 Headers," by K. Nichols, S. Blake, F. Baker, D. Black (December 1998), the entire contents of which are hereby incorporated by reference as if fully set forth herein.

For example, configuration data is received and stored at provisioning server 130 that indicates for VPN 101 the service is VPLS; the attachment circuits 122 are Ethernet virtual local area networks (VLANs), each identified by a VLAN tag in the Ethernet header; the participating edge nodes are PEs 120a, 120b, 120c; and PWs 140f, 140g, 140h have a certain level of service, e.g., a certain value for a per-hop behavior (PHB) parameter.

Example data structures for storing configuration data locally on the provider edge node or on a provisioning server, such as a Remote Authentication Dial-In User Service (RADIUS) server are illustrated in FIGS. 3A, 3B, and 3C. Some or all of these data structures may be used in other embodiments of provisioning server 130 that do not use the RADIUS protocol. FIG. 3A is a block diagram that illustrates a customer interface record 300, according to an embodiment. In the illustrated embodiment, the record 300 includes four fields, a router identification (Router ID) field 302, an attachment circuit identification (AC ID) field 304, a network virtual circuit (VC) identification (VC ID) field 306, and an attachment circuit (AC) service field 308.

The Router ID field 302 holds data that uniquely indicates a provider edge node that is to receive the configuration data. In the illustrated embodiment, this provider edge node sends a RADIUS authorization request to the provisioning server. The value of the Router ID field 302 serves as an index to a particular record in the data stored on the RADIUS server. In an illustrated embodiment, the value of the Router ID field is the IP address of the provider edge node on the provider network. An IP address is four octets that are commonly designated by four decimal values separate by three dots, where each decimal value falls between 0 and 255, inclusive. An advantage of this embodiment is that the IP address of the requesting edge node is included in the header of an IP data packet carrying the request and is automatically used by the provisioning server to find the appropriate record to use in a response. For purposes of illustration, it is assumed that PEs 120a, 120b, 120c have IP addresses 1.1.1.1, 1.1.1.2 and 1.1.1.3, respectively. For some embodiments with locally stored configuration data, the router ID field 302 is omitted.

In some embodiments, the Router ID field 302 holds the IP address of the provider edge node (e.g., PE120a) to be configured. In some embodiments, the Router ID field holds other data, such as text, that uniquely identifies the provider edge node (e.g., PE 120a) in the provider network.

The AC ID field 304 holds data that indicates a physical or logical attachment circuit on a provider edge node that is a member of a VPN. The value of the AC ID field 304 serves as a secondary index to a particular record in the configuration data stored on the provisioning server (e.g., server 130). The AC ID field serves as the primary index to a particular record in the configuration data stored locally. Any method may be used to indicate the attachment circuit. In one embodiment, the AC ID field 304 holds data that uniquely indicates physical links on the router identified in Router ID field 302, such as some combination of the physical port ID and a virtual circuit ID. For example, a certain class of routers internally number the physical interfaces on each router from 0 through N, where N is the number of physical interfaces, and 0 refers to the router itself. In some embodiments the physical interfaces are named in software. In some embodiments, the AC is uniquely indicated by an arbitrary value (e.g., a name or number).

In some embodiments, the AC ID is based on a logical attachment circuit, such as a frame relay or ATM virtual circuit name, used on the CE. For example, ATM virtual circuits are identified by an ATM port name, a one-octet virtual path identifier (VPI) that indicates a group of virtual circuits, and a two-octet virtual channel identifier (VCI) in the header of an ATM cell. The VPI/VCI combination is used to identify the next destination of an ATM cell as it passes through a series of ATM switches. In embodiments using the ATM virtual circuit identifier as an arbitrary name for an attachment circuit, the AC ID comprises the ATM port, VPI and VCI. For example, if the ATM port is named "atm1/0" and the VPI is "2" and the VCI is "34," then an appropriate AC ID is "atm1/0.2.34." In the example of Table 1, an ATM port has port ID 20 and an appropriate AC ID is "20.2.34." Since the customer subscribes to the VPN, the customer names for the virtual circuits are appropriate to use as an index into the configuration data stored on the provisioning server.

In some embodiments, the AC ID field 304 holds CE ID data that uniquely identifies a piece of customer premises equipment connected to provider edge equipment. For example, a network access identifier (NAI) or a Domain Name Server (DNS) host name associated with the CE can serve as CE ID data. The use of NAI to indicate a CE is described in RFC 2486 entitled "The Network Access Identifier," by B. Aboba, M. Beadles (January 1999), the entire contents of which are hereby incorporated by reference as if fully set forth herein. The use of DNS to indicate a CE is described in RFC 1101 entitled "DNS encoding of network names and other types," by P. V. Mockapetris (April 1989), the entire contents of which are hereby incorporated by reference as if fully set forth herein. It is assumed for purposes of illustration that CE 150d has an NAI of "providerX/atlanta@vpnY.domainZ.net." For VPLS or for a CE with a single attachment circuit to a provider edge node, an AC ID value that is only a CE ID value is sufficient to determine VPN membership. For VPWS and a CE with multiple logical or physical attachment circuits to a provider edge, an AC ID includes both a CE ID along with a customer name for an attachment circuit to determine a unique identifier for an attachment circuit, and thence VPN membership.

In various embodiments, the AC ID field 304 holds either an AC specific identifier or a CE identifier, or both.

The VC ID field 306 holds data that uniquely indicates a particular collection of pseudo wires on the provider network, e.g., network 110. In a VPLS, the VC ID indicates all the pseudo wires in the VPN, e.g., PWs 140f, 140g, 140h in VPN 101. In a VPWS, the VC ID indicates a single pseudo wire that provides point-to-point traffic as part of a particular VPN. In some embodiments, the VC ID field 306 holds data that indicates a VPN-ID as described in RFC2685, the entire contents of which are hereby incorporated by references as if fully set forth herein. In some embodiments the VC ID field 306 holds data that indicates a VPN differently from the VPN-ID as described in RFC2685.

In some embodiments, the VC ID serves as an attachment group identifier (AGI) so that each attachment circuit on a VPN can be uniquely identified within the group identifier using an attachment individual identifier (AII).

The AC Service field 308 holds data that describes the service to be provided to an AC or CE. In some embodiments, the field 308 includes data that indicates the type of VPN service, e.g., whether the VPN service type is VPLS, VPWS, or IP-only LAN-like Service (IPLS) or some other type of service. In some embodiments, the field 308 includes data that indicates attachment circuit specific parameters. Attachment circuit-specific parameter include, but are not limited to: a quality of service level associated with minimum values for bandwidth, and maximum values for latency and jitter; specific values for bandwidth, latency and jitter; an attachment circuit data plane protocol and control plane protocol; authentication credentials; attachment circuit original equipment manufacturer (OEM) addresses, Operations and management (OAM) signaling; and values for configurable parameters associated with those protocols, such as cell packing for ATM, and maximum transmission unit (MTU) for packet sizes. For purposes of illustration, it is assumed that AC Service field 308 holds data that indicates a service type of VPLS with Ethernet VLAN protocol for both data and control planes on the attachment circuits, and each attachment circuit allowed up to 30% of bandwidth on a physical port.

FIG. 3B is a block diagram that illustrates a VPN record 320 on a provisioning server, according to an embodiment. In the illustrated embodiment, the record 320 includes three fields, a Router ID field 302, VC ID field 306, and an Other PE list field 324.

The Router ID field 302 and VC ID field 306 are as described above for the attachment circuit record 300. The value of the Router ID field 302 serves as a primary index, and the value of the VC ID field serves as a secondary index, to a particular VPN record 320 in the data stored on the provisioning server. The Router ID field 302 is omitted and the VC ID field serves as the primary index to the record 320 in some embodiments in which the configuration data is stored locally.

The Other PE list field 324 holds data that indicates one or more provider edge nodes to which the edge node identified in Router ID field 302 forms pseudo wires to support the VC indicated in the VC ID field 306. For VPWS, the Other PE list 324 includes an identifier for a single PE different than the PE indicated by the Router ID field 302. In the example VPWS, VPN 100, the Other PE list field 324 for the record with Router ID value 1.1.1.1 (PE 120a) and VC ID corresponding to PW 140a holds data that indicates PE 120c, such as its IP address 1.1.1.3. In the same example, the Other PE list field 324 for the record with Router ID value 1.1.1.3 (PE 120c) holds data that indicates PE 120a. For VPLS, the Other PE list 324 includes identifiers for all PEs on the VPN different than the PE indicated by the Router ID field 302. In the example VPLS, VPN 101, the Other PE list field 324 for the record with Router ID value 1.1.1.1 (PE 120a) and VC ID corresponding to VPN 101 with PWs 140f, 140g, 140h, holds data that indicates PE 120b and PE 120c, such as their IP addresses.

FIG. 3C is a block diagram that illustrates a pseudo wire record 340 on a provisioning server, according to an embodiment. In the illustrated embodiment, the record 340 includes three fields, a Router ID field 302, an Other PE ID field 344, and a pseudo wire (PW) properties field 348.

The Router ID field 302 is as described above for both the attachment circuit record 300 and VPN record 320. The Router ID field 302 serves as a primary index to a particular PW record 340 in the data stored on the provisioning server. The Router ID field 302 is omitted in some embodiments in which the configuration data is stored locally.

The Other PE ID field 344 holds data that indicates a target provider edge node for a particular pseudo wire. The Other PE ID field 344 serves as a secondary index to a particular PW record 340 in the data stored on the provisioning server. The Other PE field 344 serves as the primary index to the record 320 in some embodiments in which the configuration data is stored locally. In some embodiments, the field 344 includes just an identifier for the router. In some embodiments the field 344 includes also an identifier for a particular attachment circuit on the target router.

The PW properties field 348 holds data that indicate one or more properties of the PW that are used to configure a provider edge node to form the PW. For example, in some embodiments, the PW properties field includes data that indicates a control plane protocol (e.g., the Label Distribution Protocol, LDP) for negotiating the PW with the target provider edge node. In some embodiments, the PW properties field includes data that indicates a value of an EXP parameter (e.g., a hexadecimal value "3" designated "0x03") as described in RFC3032, cited above. In some embodiments, the PW properties field 348 includes one or more pairs of attributes and values for PW properties.

An advantage of the data structures described above with reference to FIG. 3A, FIG. 3B and FIG. 3C, is that they allow the hierarchical relationships between attachment circuits, VPN edge node members and pseudo wires to be represented as flat files used by some provisioning servers, such as RADIUS servers. The configuration data stored in these data structures may be sent to a provider edge node in one or multiple different response messages. Another advantage of these data structures are that they are small and thus can be used to send incremental changes in configuration data to provider edge nodes.

In another embodiment, data for two or more of these data structures are combined into the same data structure on the provisioning server. An advantage of combining these data structures is that fewer operations are required on the provisioning server to retrieve the configuration data. Thus the combined data can be returned in one transaction. A disadvantage of combining these data structures is that data not relevant to a particular edge node and attachment circuit is included in a record and retrieved. Thus, either the provisioning server or the receiving provider edge node consumes processing resources to filter out the unwanted information. If the receiving node does the filtering, then extra network resources are consumed to transmit the excess data.

Referring again to FIG. 2A, in step 260, configuration data is obtained for an attachment circuit. In some embodiments, the configuration data is stored in multiple data records 300, 320, 340 as described above with reference to FIG. 3A, FIG. 3B, FIG. 3C. In an illustrated embodiment, the configuration data is stored on a provisioning server, e.g., provisioning server 130; and step 260 includes sending a request message to the provisioning server for data in one or more of the data records 300, 320, 340, and receiving configuration data in one or more response messages.

2.2 Method for Detecting FSOL

FIG. 2B is a flow diagram that illustrates steps of the method of FIG. 2A for detecting a first sign of life (FSOL) in more detail, according to an embodiment. Step 241 is a particular embodiment of step 240 and step 261 is a corresponding particular embodiment of step 260. After a signal is received in step 220, control passes to step 241. Step 241 includes steps 242, 244, 246.

In step 242, it is determined whether the signal is a hardware signal from a customer device that has just been connected to a physical port of the provider edge node and powered up. For example any sequence of voltage changes in the design range for the equipment on a port where there was no physical attachment before can be treated as a hardware signal to indicate an attachment circuit is now attached to the port. If the signal is an initial hardware signal, then the signal is a FSOL. If it is determined that the signal is not an initial hardware signal, control passes to step 244, described in more detail below.

If it is determined that the signal is an initial hardware signal, then control passes to step 262. In step 262 configuration data is obtained for the physical port, itself. For example, if a hardware signal is received on a physical port with physical port ID 5 for the first time, control passes to step 262 to obtain configuration data for that physical port.

FIG. 2D is a flow diagram that illustrates step 262 of the method of FIG. 2A for obtaining configuration data for a physical port in more detail, according to an embodiment 272. Step 272 is a particular embodiment of step 262. Step 272 includes step 273 and step 275. In step 273 one or more requests are sent to one or more provisioning servers identified in step 212. The request identifies the sending node and the physical port, for example by the IP address of the sending node in the header of the request and the physical port ID number of the port. For example, a request from PE 120*a* for port #4 includes a source address of 1.1.1.1 in an IP header and a physical port ID of 4, with no data indicating a particular virtual circuit.

In step 275, one or more response messages are received from one or more provisioning servers. The response messages include data that indicates:

1] one or more VPNs used by that physical port; or
2] a customer device type to be connected on that physical port; or
3] one or more virtual circuits to be expected on that physical port; or some combination of 1], 2] and 3]. For purposes of illustration, it is assumed that a response message is received that indicates the physical port is to be connected to an Ethernet LAN, with different VLANS that join either a VPWS VPN 100 or a VPLS VPN 101.

After step 262, control passes to step 280, described in more detail in a later section with reference to FIG. 2C.

In step 244, it is determined whether the signal is a control plane data packet for establishing a new switched virtual circuit. For example, it is determined that the signal is a control data packet to establish an ATM switched virtual circuit or a call setup control data packet to establish a FR switched virtual circuit or a PPP session. If it is determined that the signal is not a control plane data packet for establishing a new switched virtual circuit, control passes to step 246, described in more detail below.

If it is determined in step 244 that the signal is a control plane data packet for establishing a new switched virtual circuit, control passes to step 264. In step 264 configuration data is obtained for the virtual circuit identified in the control plane data packet. For example, if an ATM control plane data packet is received to establish an ATM virtual circuit, the data packet contains an identifier for the virtual circuit that includes a VPI and VCI pair, e.g., "2.34" as described above. The provider edge node adds an interface name for the ATM interface over which the control data packet was received, e.g., "20." Configuration data is then retrieved for that particular virtual circuit e.g., "20.2.34." Similarly, a FR call setup data packet includes an identifier for the virtual circuit called a data-link connection identifier (DLCI), e.g., "11." The provider edge node adds an interface name for the FR interface over which the control data packet was received, e.g., "25." Configuration data is then retrieved for that particular virtual circuit e.g., "25.11."

FIG. 2E is a flow diagram that illustrates step 264 of the method of FIG. 2A for obtaining configuration data for a virtual circuit in more detail, according to an embodiment 274. Step 274 is a particular embodiment of step 264. Step 274 includes step 277 and step 279. In step 277 one or more requests are sent to one or more provisioning servers identified in step 212. The request identifies the sending node and the virtual circuit, for example by the IP address of the sending node in the header of the request and the virtual circuit identifier. For example, a request from PE 120a for the ATM switched virtual circuit includes a source address of 1.1.1.1 in an IP header and a virtual circuit ID of "20.2.34." Similarly, a request from PE 120a for the FR switched virtual circuit includes a source address of 1.1.1.1 in an IP header and a virtual circuit ID of "25.11."

In step 279, one or more response messages are received from one or more provisioning servers. The response messages include data that indicates:

1] a VPN used by that virtual circuit; or
2] service properties for that virtual circuit;
3] one or more target provider edge nodes for those VPNs; or
4] one or more pseudo wires and pseudo wire properties to each of those target provider edge nodes; or
5] one or more target attachment circuits for each pseudo wire; or some combination of 1], 2], 3], 4] and 5]. If the virtual circuit is not found in the configuration data, then a message is returned that the customer has not subscribed to such a virtual circuit. For purposes of illustration, it is assumed that a response message is received that indicates the virtual circuit "20.2.34" is configured for VPWS service on VLAN 100 to target PE 120b over PW 140d to AC 122g, with a budget of 20% of the bandwidth and cell packing value of 1.

After step 264, control passes to step 280, described in more detail in a later section with reference to FIG. 2C.

Not every virtual circuit is a switched virtual circuit that uses control plane data packets to explicitly establish the circuit. Some virtual circuits are permanent, or assumed in place, and are used to send data packets from the outset. For example, Ethernet VLAN and ATM and FR permanent virtual circuits send data packets from the beginning, without explicit control plane data packets to establish the circuit. For these virtual circuits, a FSOL is implicit in the first data packet received that identifies itself as belonging to that virtual circuit. In the illustrated embodiment, this implicit FSOL is detected by using the list 129 of active attachment circuits associated with each physical port, described above in step 214. In other embodiments other methods may be used.

For example, cHDLC packets start with a hexadecimal value "0F00," possibly with additional bits set. Given the start value of 0F00 is detected in a data packet received, the cHDLC protocol is used to determine the virtual circuit associated with that data packet. Similarly, HDLC keep-alive data packets could be sought; such keep-alive messages include the value "8F008035." Given the value of 8F008035 is detected in a data packet received; the HDLC protocol is used to determine the virtual circuit associated with that keep-alive data packet. Similarly, FR LMI keep-alive data packets could be looked for; such keep-alive messages include the hexadecimal value "FCF1" and DLCI hexadecimal value "1023." Given the values of FCF1 and 1023 are detected in a data packet received, the FR LMI protocol is used to determine the virtual circuit associated with that keep-alive data packet. Similarly, FR ANSI/UTI keep-alive data packets could be looked for; such keep-alive messages include the hexadecimal value "0001," and DLCI hexadecimal value "0." Given the values of 0001 and 0 are detected in a data packet received, the FR ANSI/UTI protocol is used to determine the virtual circuit associated with that keep-alive data packet. Similarly, a PPP data packet is indicated by the hexadecimal value "FF03." However, "FF03" is also used in other protocols to indicate a broadcast data packet; so, in some embodiments, if the hexadecimal value is FF03, then other fields in the data packet are also examined to determine whether the packet is a PPP control packet, such as a Link control Protocol (LCP) data packet. The above examples apply to determine the virtual circuit for port mode operation (i.e., the whole physical port contains traffic for only a single virtual circuit), but would not be sufficient to identify individual FR VCs which are multiplexed on the same physical port. To identify a multiplexed VC, further examination of the packets are involved. For example, in some embodiments, to identify individual FR VCs, incoming LMI Full Status messages are examined for the list of VCs. In some embodiments, the DLCI field on incoming data packets are examined. Thus a virtual circuit ID, if any, can be determined for any data packet received.

In step 246, it is determined whether the signal is a data plane data packet for an attachment circuit that is already associated with the physical port. For example, it is determined that the signal is a data packet on an Ethernet VLAN or ATM or FR permanent virtual circuit in the list of attachment circuits associated with the physical port. For example, if an Ethernet data packet is received on physical port #4 with a VLAN tag of "46," the provider edge node checks against the list of active attachment circuits, as illustrated in Table 2, above. If the list is null or if the list does not contain a VLAN tag of "46", then no data for this virtual circuit has yet been received by the provider edge node, and the data packet is a FSOL. In the illustrated embodiment, the first time an Ethernet data packet with a VLAN tag "46" is received on physical port 4, the null list is detected and the data packet is considered FSOL. Control then passes to step 261 to obtain configuration data for the attachment circuit. If consistent configuration data is returned for this virtual circuit, then in step 280, described in more detail below with reference to FIG. 2C, the virtual circuit ID is added to the list of active attachment circuits for the physical port. For example, if consistent configuration data is received for VLAN 46, then VLAN 46 is added to the list 129a for physical port #4. The illustrated list of attachment circuits will then appear as shown in Table 3.

TABLE 3

Example later associations between ports and active attachment circuits.

| Physical port ID | List of active attachment circuits |
|---|---|
| 3 | null |
| 4 | VLAN 46 |
| 5 | null |
| . . . | null |

Any method may be used to distinguish a virtual circuit or physical circuit from a null value. In some embodiments "null" is replaced with a special code that indicates an active attachment circuit, but one that is never used as a VLAN tag. In some embodiments, the list is indicated as a number of entries followed by a list of those entries or a pointer to the next entry. A null list has "0" for the number of entries and a dedicated physical port has a "1" for number of entries but no value, or "0" for the pointer.

If it is determined that the signal is a data plane data packet for an attachment circuit that is already associated with the physical port, control passes to step 250, described above, to determine whether the signal is a control plane data packet to tear down a virtual circuit and, ultimately, to process the signal normally (including ignoring the signal).

If it is determined in step 246 that the signal is not a data plane data packet for an attachment circuit that is already associated with the physical port, then the signal is FSOL and control passes to step 261. In step 262 configuration data is obtained for the dedicated physical circuit identified in the data packet, if any, as described above. In step 264 configuration data is obtained for the virtual circuit identified in the data packet, if any, as described above. In some embodiments, when the physical port comes up, the provisioning server is contacted and if the response is to join a VPN at the interface level, all further sensing for VCs and such are disabled. For example, steps 244 and 126 are omitted. So, regardless of DLCI, VPI/VCI, VLAN ID or any other identifier for a logical virtual circuit, if the provisioning response is an interface-level service, the interface is not checked for auto-detection of any VCs until something changes for that interface. In some embodiments, a multi-stage process is used. Determining VPN configuration based on a physical interface level is the first stage. The next level of granularity would be VPN configuration based on a detected virtual circuit. The next level of granularity would be VPN configuration based on layer 3 protocols carried within a circuit type, etc. Also, for Ethernet LAN with no VLAN tags, the untagged frames really can be considered another virtual circuit along with the tagged frames.

In other embodiments, steps 242, 244, 246 are performed in a different order than shown in step 241.

2.3 Method for Responding to FSOL

Figure 2C:
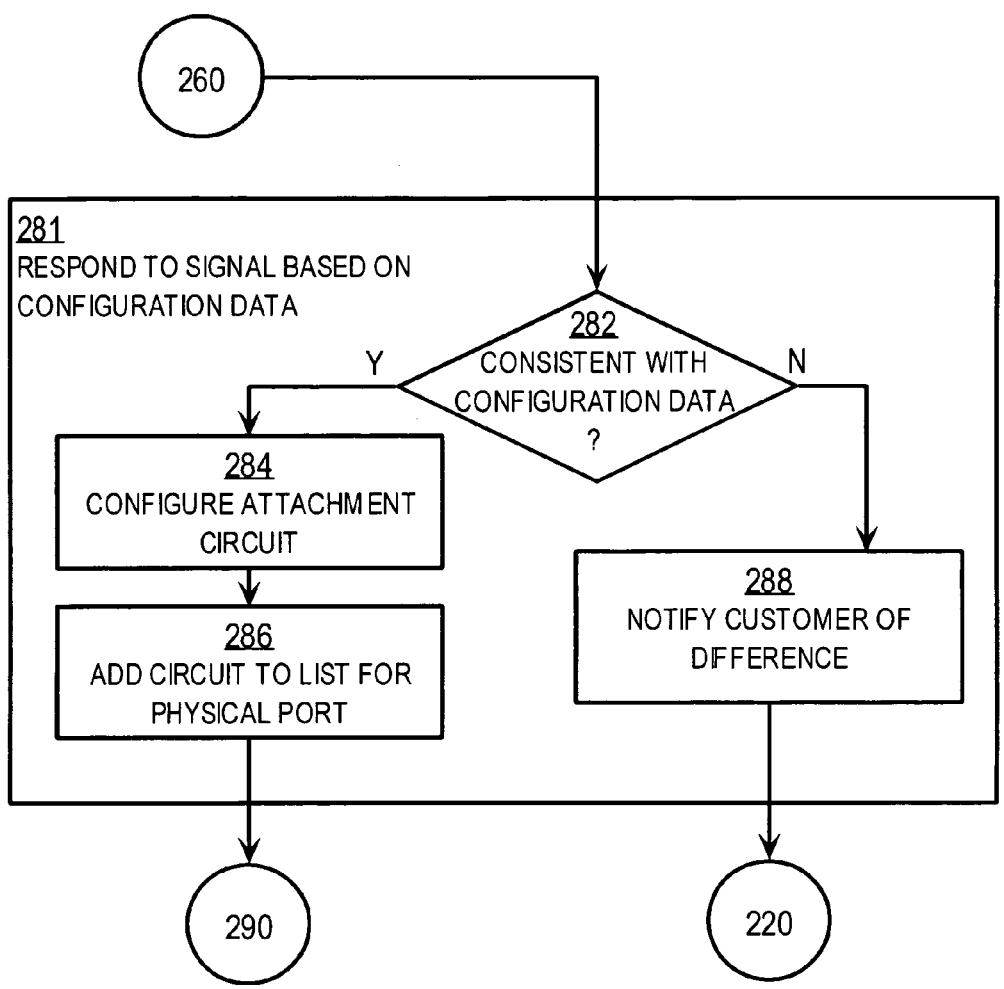
FIG. 2C is a flow diagram that illustrates steps of the method of FIG. 2A for responding to a signal based on configuration data in more detail, according to an embodiment.

FIG. 2C is a flow diagram that illustrates step 280 of the method of FIG. 2A for responding to a FSOL based on configuration data in more detail, according to an embodiment 281. Step 281 is a particular embodiment of step 280. Step 281 includes steps 282, 284, 286, 288. In other embodiments, one or more of these steps are omitted. For example in some embodiments, step 288 is omitted. In some embodiments, step 284 is omitted. In embodiments that do not use a list of active attachment circuits, step 286 is omitted.

In step 282, it is determined whether the signal received is consistent with the configuration data retrieved. For example, it is determined whether the configuration data indicates the customer has subscribed with the provider for a VLAN "46" on port #4, or an ATM "2.34" on port #20, or a FR "11" on port #25. If not, control passes to step 288, described below. Consistency depends upon a policy programmed into the provisioning server. In various embodiments, the router comes up with some sort of AC circuit ID value to send to the provisioning server; and, in response, the provisioning server sends the router a message that indicates whether the value is valid or not. The invalidity may be due to something as simple as an out of range number, or no service being paid for by a customer, among other causes for invalidity.

If it is determined in step 282 that the signal received is consistent with the configuration data retrieved, then control passes to step 284, or 286, or 290. In the illustrated embodiment, control passes first to step 284, then to step 286, then to step 290.

In step 284 the attachment circuit is configured according to the configuration data without human intervention. For example, VLAN "46" (e.g., 122*l*) is joined to VPN 101 with VPLS as indicated by configuration data received from record 300. The AC is joined to the VPN 101 by being switched to PW 140*g* to PE 120*b* as indicated by the configuration data received from record 320. The attributes of PW 140*g* are indicated by the configuration data received from record 340. In an alternative embodiment, ATM "2.34" (e.g., 122*d*) is joined to VPN 100 with VPWS as indicated by configuration data received from record 300. The ATM VC is joined to VPN 100 by being switched to PW 140*d*. PW 140*d* connects to PE 120*b* and AC 122*g* as indicated by the configuration data received from record 320. The attributes of PW 140*d* are indicated by the configuration data received from record 340. Similarly, FR "11" (e.g., 122*a*) is joined to VPN 100 with VPWS as indicated by configuration data received from record 300. This AC is being switched to PW 140*a* to PE 120*c* and AC 122*k* as indicated by the configuration data received from record 320. The attributes of PW 140*a* are indicated by the configuration data received from record 340.

In some embodiments, the provider edge node is already configured for the VPN, and step 284 is omitted.

In step 286, the attachment circuit is added to the list 129 for the physical port. By adding the attachment circuit to the list, subsequent data packets for the same attachment circuit are not considered FSOL. For example, VLAN 46 is added to list 129*a* for physical port #4. Similarly, ATM "2.34" is added to the list 129*a* for physical port #20, or FR "11" is added to the list 129*a* for physical port #25. It is further assumed, for purposes of illustration that another VLAN, with VLAN tag "17," was received on physical port #4. Table 4 illustrates a portion of the list 129*a* after the FSOL has been detected and reconciled with configuration data for all four example attachment circuits.

TABLE 4

Example still later associations between ports and active attachment circuits.

| Physical port ID | List of active attachment circuits |
|---|---|
| 3 | null |
| 4 | VLAN 46, VLAN 17 |
| 5 | null |
| ... | null |
| 20 | "2.34" |
| ... | null |
| 25 | "11" |
| ... | null |

Control then passes to step 290 to process the signal normally. For example, the data packet is switched to the appropriate pseudo wire for delivery to the appropriate target provider edge node.

When a subsequent data packet is received in step 220 for an attachment circuit that is on the list 129 of active attachment circuits, that data packet is not a FSOL, as determined in step 240, and control passes directly to step 250 as described above. It is assumed for purposes of illustration that a second Ethernet frame is received in step 220 on port #4 with the VLAN tag "46." In step 242 it is determined that the data packet is not an initial hardware signal and control passes to step 244. In step 244 it is determined that the data packet is not a control plane packet to establish a switched virtual circuit and control passes to step 246. In step 246, it is determined that VLAN tag "46" appears in the list 129*a* for port #4, as shown in Table 4. Therefore control passes to step 250 and ultimately to step 290 to process the data packet normally. For example, the data packet is switched to PWs 140*f* and 140*g* for delivery to PE 120*c* and PE 120*b*, respectively.

If it is determined in step 282 that the signal received is not consistent with the configuration data retrieved, then control passes to step 288. In other embodiments, step 288 is omitted; the signal is ignored and control passes to step 220 to receive the next signal.

In step 288, the customer is notified of the difference between the signal received and the configuration data. The configuration data indicates the service for which the customer has subscribed with the provider, e.g., the configuration data indicates the service that the customer has paid for or agreed to pay for. Any method may be used to notify the customer of the discrepancy. For example, in some embodiments an email is sent to an email address of an agent of the customer. In some embodiments an email is sent to an email address of an agent of the provider who then contacts the customer to determine how the customer wants to respond. The customer may be given the option to add or change the subscribed service to be consistent with the actual signals received. For example, if VLAN 46 is received in a data packet but does not appear in any record 300, then the customer may be prompted in step 288 to pay for a subscription that adds VLAN 46 to VPN 101.

In some embodiments, a message in the protocol received is sent back through the interface where the signal was received. In some embodiments, the message sent back simply indicates that the signal is rejected. In some embodiments, the message indicates the signal is not consistent with the subscribed service. In some embodiments, the message indicates the customer should contact the provider to add the service. In some embodiments, the message indicates the cost of providing the service indicated by the signal and the customer is invited to add the service automatically and prompted for any additional information useful to establish the new service without further intervention by a human network administrator for the provider.

In some embodiments step 288 includes receiving a response from the customer to add the service consistent with the signal. In such embodiments, control then passes to step 284, described above, to configure the attachment circuit. Control then passes, in some embodiments, to step 286 to add the new attachment circuit to the list for the physical port. In some embodiments, step 288 includes the step of sending the new service request from the customer to the provisioning server to add to the configuration data stored there in records 300, 320, 340.

2.4 Method for Maintaining List of Active Attachment Circuits

In the illustrated embodiment, attachment circuits are sometimes removed from the list 129 of active attachment circuits. For example, when a control plane data packet to tear down a switched virtual circuit is received, the virtual circuit is removed from the list 129. If the signal received in step 220 is determined in step 240 to not be FSOL, control passes to step 250. In step 250 it is determined whether the signal is a control plane data packet to tear down the switched virtual circuit, e.g. an ATM or FR switched virtual circuit. If not, t, control passes to step 290 to process the signal normally. However, if it is determined that the signal is a control plane data packet to tear down the switched virtual circuit, then control passes to step 252. For example, if the signal is a control plane data packet to tear down ATM "2.34," control passes to step 252. In step 252, the virtual circuit to be torn down is removed from the list 129*a* of active attachment circuits. In the example embodiment, ATM "2.34" is removed from the list 129*a* If no attachment circuits remain, a null list is entered. The modified list 129*a* for this example is given in Table 5.

TABLE 5

Example associations between ports and active attachment circuits after ATM tear down.

| Physical port ID | List of active attachment circuits |
|---|---|
| 3 | null |
| 4 | VLAN 46, VLAN 17 |
| 5 | null |
| ... | null |
| 20 | null |
| ... | null |
| 25 | "11" |
| ... | null |

In some embodiments, a background process checks and maintains the list of attachment circuits.

In some embodiments, the background process periodically checks the non-null entries listed for each physical port to determine whether that attachment circuit still appears in the configuration data. For example, if a customer un-subscribes to a service involving that attachment circuit, then the attachment circuit is expunged from the list. Thus, if the customer un-subscribes from using VLAN 46, and VLAN 46 no longer appears in the configuration data, e.g., no longer appears in any record 300, then VLAN 46 is removed from the list. If the removed attachment circuit is the last attachment circuit, then a null list is associated with the physical port.

In some embodiments, the list of active attachment circuits also includes data that indicates a time when a data packet for that attachment circuit was last received on the physical port. The background process then determines whether sufficient time has elapsed since the last data packet to conclude that the attachment circuit is no longer active. For example, if no traffic is received on an attachment circuit for 12 hours, the attachment circuit is considered inactive and is removed from the list. Any method may be used to record the time since the last traffic on an attachment circuit. For example, in some embodiments, the threshold time for concluding that an attachment circuit is inactive is entered in the list with the attachment circuit identifier whenever a packet is checked for FSOL in step 240. The background process then periodically visits every entry in the list and decrements the time by an amount commensurate with the time to cycle through the entire list. When the time reaches zero, the attachment circuit is concluded to be inactive and is removed from the list.

3.0 Implementation Mechanisms—Hardware Overview

Figure 4:
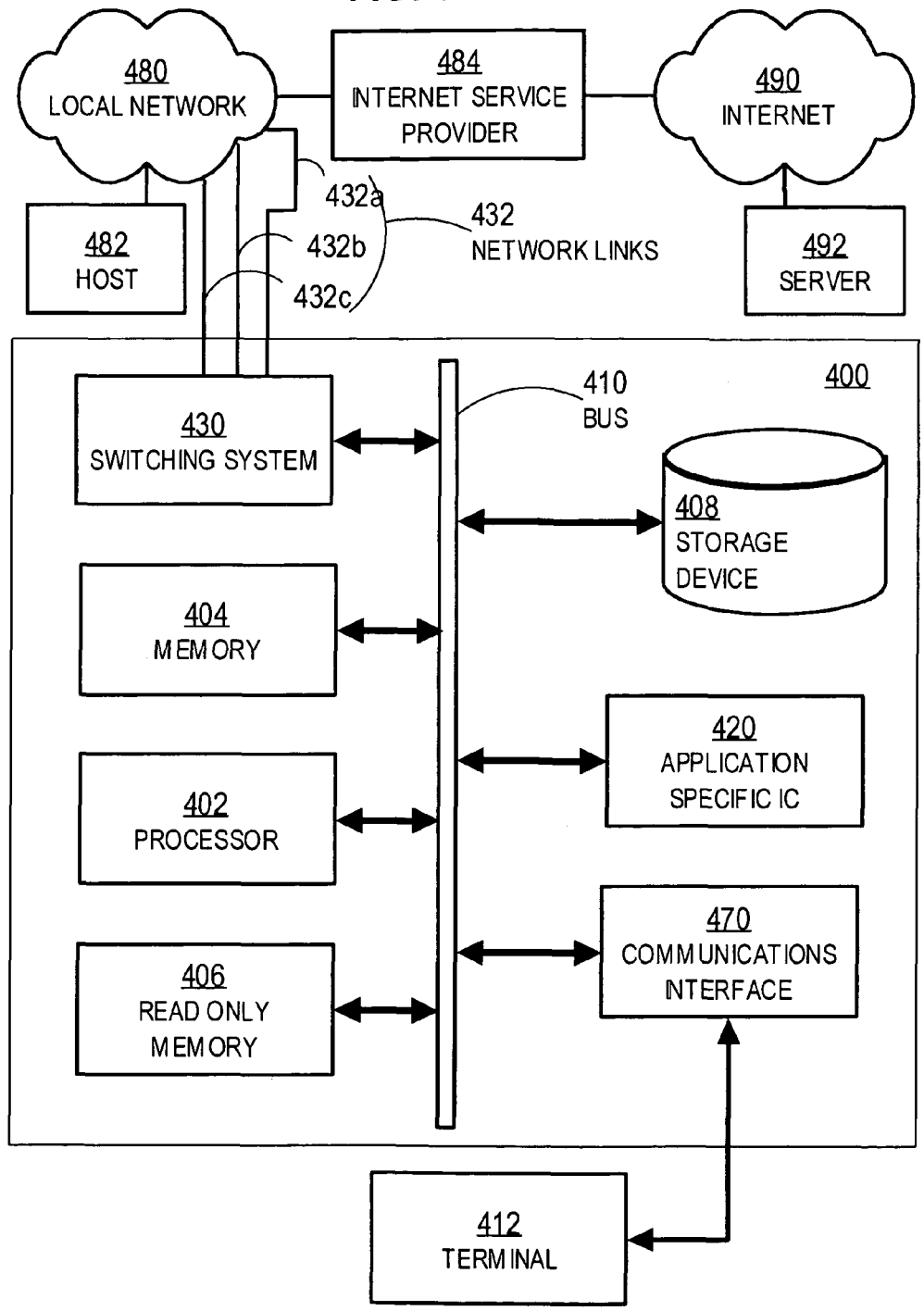
FIG. 4 is a block diagram that illustrates a computer system upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0,1w) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

3.0 Extensions and Alternatives

In this specification and Appendix, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

receiving a signal on a particular interface of a particular node at an edge of a provider network; and determining whether the signal indicates that the particular interface is changing from an inactive state to an active state, wherein the signal is a first sign of life (FSOL) that directs the particular node to interface with a provisioning server, which provides configuration data to the particular node for provisioning a service involving the particular node and for creating a pseudowire coupled to the particular node, wherein if the signal is not a FSOL, a determination is made as to whether the signal is a control signal to tear down a circuit and if it is, then the circuit is torn down and the circuit is removed from a list of active circuits, wherein the configuration data identifies a virtual private local area network (LAN) service (VPLS), a quality of service parameter, and a plurality of virtual LANs (VLANS) each of which being identified by a VLAN tag in an Ethernet header, and wherein a determination is made whether the FSOL is consistent with the configuration data, the determination being related to a policy configured in the provisioning server, and wherein if the configuration data is consistent, then an attachment circuit is configured according to the configuration data without human intervention, and wherein the attachment circuit is added to a list for a corresponding physical port such that subsequent data packets for the attachment circuit are not considered indicative of a FSOL condition.

2. A method as recited in claim 1, wherein:

said step of using configuration data to configure the particular interface for the particular virtual private network further comprises the steps of sending, to a first server on a first host computer of the provider network, interface identification data that uniquely indicates the particular interface, and in response to sending the interface identification data, receiving configuration data from a second server on a second host computer of the provider network; and the particular node is different from the first host and second host.

3. A method as recited in claim 2, wherein the first server on the first host is the same as the second server on the second host.

4. A method as recited in claim 2, further comprising receiving data at the particular node that indicates an address on the provider network for the first server.

5. A method as recited in claim 2, wherein the first server is a Remote Access Dial-In Service (RADIUS) Server and the second server is the RADIUS server.

6. A method as recited in claim 1, said using configuration data to configure the particular interface for a particular virtual private network over the provider network further comprising using configuration data to configure the particular interface for a particular virtual private network over the provider network without human intervention.

7. A method as recited in claim 1, said using configuration data to configure the particular interface for a particular virtual private network over the provider network further comprising the steps of:
determining whether the signal is consistent with the configuration data; and
if it is determined that the signal is not consistent with the configuration data, then causing a message to be sent to a customer associated with the customer network node that notifies the customer that a signal was attempted that is not consistent with subscribed service.

8. A method as recited in claim 1, wherein the particular interface is a virtual circuit of a plurality of virtual circuits on the same physical circuit.

9. A method as recited in claim 1, wherein the particular interface is a physical circuit.

10. A method as recited in claim 1, said step of determining whether the signal is a FSOL further comprising determining whether the signal is a control plane data packet sent to establish a switched virtual circuit.

11. A method as recited in claim 1, said step of determining whether the signal is a FSOL further comprising determining whether the signal is an initial data plane data packet sent over a permanent virtual circuit.

12. An apparatus comprising:
means for receiving a signal on a particular interface of a particular node at an edge of a provider network; and
means for determining whether the signal indicates that the particular interface is changing from an inactive state to an active state, wherein the signal is a first sign of life (FSOL) that directs the particular node to interface with a provisioning server, which provides configuration data to the particular node for provisioning a service involving the particular node and for creating a pseudowire coupled to the particular node, wherein if the signal is not a FSOL, a determination is made as to whether the signal is a control signal to tear down a circuit and if it is, then the circuit is torn down and the circuit is removed from a list of active circuits, wherein the configuration data identifies a virtual private local area network (LAN) service (VPLS), a quality of service parameter, and a plurality of virtual LANs (VLANS) each of which being identified by a VLAN tag in an Ethernet header, and wherein a determination is made whether the FSOL is consistent with the configuration data, the determination being related to a policy configured in the provisioning server, and wherein if the configuration data is consistent, then an attachment circuit is configured according to the configuration data without human intervention, and wherein the attachment circuit is added to a list for a corresponding physical port such that subsequent data packets for the attachment circuit are not considered indicative of a FSOL condition.

13. An apparatus comprising:
a provider network interface that is coupled to a provider network for communicating therewith a data packet;
a customer network interface that is coupled to customer premises equipment outside the provider network for communicating therewith a data packet;
one or more processors;
a memory; and
one or more sequences of instructions stored in the memory, which, when executed by the one or more processors, causes the one or more processors to carry out the step of:
receiving a signal on the customer network interface;
determining whether the signal indicates that a particular interface on the customer network interface is changing from an inactive state to an active state, wherein the signal is a first sign of life (FSOL) that directs a particular node to interface with a provisioning server, which provides configuration data to the particular node for provisioning a service involving the particular node and for creating a pseudowire coupled to the particular node, wherein if the signal is not a FSOL, a determination is made as to whether the signal is a control signal to tear down a circuit and if it is, then the circuit is torn down and the circuit is removed from a list of active circuits, wherein the configuration data identifies a virtual private local area network (LAN) service (VPLS), a quality of service parameter, and a plurality of virtual LANs (VLANS) each of which being identified by a VLAN tag in an Ethernet header, and wherein a determination is made whether the FSOL is consistent with the configuration data, the determination being related to a policy configured in the provisioning server, and wherein if the configuration data is consistent, then an attachment circuit is configured according to the configuration data without human intervention, and wherein the attachment circuit is added to a list for a corresponding physical port such that subsequent data packets for the attachment circuit are not considered indicative of a FSOL condition.

14. An apparatus as recited in claim 13, wherein:
said step of using configuration data to configure the particular interface for the particular virtual private network further comprises the steps of
sending, to a first server on a first host computer of the provider network, interface identification data that uniquely indicates the particular interface, and
in response to sending the interface identification data, receiving configuration data from a second server on a second host computer of the provider network; and
the particular node is different from the first host and the second host.

15. An apparatus as recited in claim 14, wherein the first server on the first host is the same as the second server on the second host.

16. An apparatus as recited in claim 14, wherein execution of the one or more sequences of instructions further causes the one or more processors to carry out the step of receiving data at the particular node that indicates an address on the provider network for the first server.

17. An apparatus as recited in claim 14, wherein the first server is a Remote Access Dial-In Service (RADIUS) Server and the second server is the RADIUS server.

18. An apparatus as recited in claim 13, said using configuration data to configure the particular interface for a particular virtual private network over the provider network further comprising using configuration data to configure the particular interface for a particular virtual private network over the provider network without human intervention.

19. An apparatus as recited in claim 13, said using configuration data to configure the particular interface for a particular virtual private network over the provider network further comprising the steps of:
   determining whether the signal is consistent with the configuration data; and
   if it is determined that the signal is not consistent with the configuration data, then causing a message to be sent to a customer associated with the customer network node that notifies the customer that a signal was attempted that is not consistent with subscribed service.

20. An apparatus as recited in claim 13, wherein the particular interface is a virtual circuit of a plurality of virtual circuits on the same physical circuit.

21. An apparatus as recited in claim 13, wherein the particular interface is a physical circuit.

22. An apparatus as recited in claim 13, said step of determining whether the signal is a FSOL further comprising determining whether the signal is a control plane data packet sent to establish a switched virtual circuit.

23. An apparatus as recited in claim 13, said step of determining whether the signal is a FSOL further comprising determining whether the signal is an initial data plane data packet sent over a permanent virtual circuit.

* * * * *